US008185881B2

(12) United States Patent  (10) Patent No.:  US 8,185,881 B2
Brand et al.  (45) Date of Patent:  May 22, 2012

(54) PROCEDURE SUMMARIES FOR POINTER ANALYSIS

(75) Inventors: Daniel Brand, Millwood, NY (US); Marcio Buss, Croton, NY (US); Vugranam C Sreedhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 11/765,396

(22) Filed: Jun. 19, 2007

(65) Prior Publication Data

US 2008/0320451 A1  Dec. 25, 2008

(51) Int. Cl.
G06F 9/44 (2006.01)
(52) U.S. Cl. ............ 717/132; 700/98; 52/646; 717/131; 717/141; 717/143; 717/154
(58) Field of Classification Search .................. 717/111, 717/131, 132, 143, 154, 155
See application file for complete search history.

(56) References Cited

U.S. PATENT DOCUMENTS

| | | | | |
|---|---|---|---|---|
| 4,813,076 | A * | 3/1989 | Miller | 704/254 |
| 4,820,059 | A * | 4/1989 | Miller et al. | 704/254 |
| 5,432,895 | A * | 7/1995 | Myers | 345/419 |
| 5,490,239 | A * | 2/1996 | Myers | 345/581 |
| 5,751,289 | A * | 5/1998 | Myers | 345/419 |
| 6,526,455 | B1 * | 2/2003 | Kamimura | 719/316 |
| 2005/0094621 | A1 | 5/2005 | Acharya | |
| 2008/0091649 | A1 | 4/2008 | Lim | |

OTHER PUBLICATIONS

Shen et al., "Lightweight Reference Affinity Analysis", 2005.*
David Binkley, "Source Code Analysis: A Road map", 2007.*
Corbera et al., "A Framework to Capture Dynamic Data Structures in Pointer-Based Codes", 2001.*
Nystrom et al., "Bottom-up and Top-Down Context-Sensitive Summary-Based Pointer Analysis", 2004.*
L.O. Andersen,Program Analysis and Specialization for the C Programming Language, Phd. thesis.DIKU,University of Copenhagen, May 1994.
W. Bush, J. Pincus, D. Sielaff, A Static Analyzer for Finding dynamic Programming Errors, Software-Practise and Experience, 30(7):775-802,2000.
D. Chase, M. Wegman, F. Zadek, Analysis of Pointers and Structures, Proceedings of the SIGPLAN '90 Conference on Program Language Design and Implementation, pp. 296-310, 1990.
Ramkrishna Chatterjee, Barbara Ryder, William A. Landi, Relevant Context Inference, Proceedings of Principles of Programming Languages POPL, pp. 133-146, 1999.
Manuvir Das, Unification based Pointer Analysis with Directional Assignments, Proceedings of Programming Language Design and Implementation(PLDI), pp. 35-46, 2000.
Alain Deutsch, Interprocedural may-alias analysis for pointers:Beyond k-limiting, ACM SIGPLAN 94-6/94, pp. 230-241, 1994.

(Continued)

*Primary Examiner* — Phillip Nguyen
(74) *Attorney, Agent, or Firm* — August Law, LLC; George Willinghan

(57) ABSTRACT

Pointer analysis is used for different applications, e.g., compilers, debugging tools and programs understanding tools, each having different requirements. A framework for pointer analysis is provided that defines a multidimensional space, for example a three-dimensional space, containing an order sensitivity dimension, a predicate sensitivity dimension and a value persistence dimension. A point in the three-dimensional space is identified. This point yields values for order sensitivity, predicate sensitivity and value persistence. Pointer analysis is then conducted on a computer program in accordance with the identified values for order sensitivity, predicate sensitivity and value persistence.

14 Claims, 1 Drawing Sheet

OTHER PUBLICATIONS

M. Emami, R. Ghiya, L. Hendren, Context-sensitive Interprocedural points to analysis in the presence of function pointers, Proceedings of Programming Language Design and Implementation(PLDI),pp. 242-256, 1994.

Mary Jean Harrold and Gregg Rothemel, Separate Computation of alias information for Reuse, IEEE Trans. of Software Engineering, 22(7):442-460,1996.

W. Landi, B. Ryder, A Safe Approximation Algorithm for Interprocedural Pointer Aliasing, Proceedings of Programming Language Design and Implementation (PLDI) pp. 235-248, 1992.

W. Landi, B. Ryder,Sean Zhang, Interprocedural Modification side effect Analysis with Pointer Aliasing, Proceedings of Programming Language Design and Implementation (PLDI) pp. 56-67, 1993.

Bjarne Steensgaard, Points to Analysis in Almost Linear Time, POPL '96, Proceedings of the 23rd ACM SIGPLAN-SIGACT symposium on Principles of Programming Languages, pp. 32-41, 1996.

John Whaley and Martin Rinard, Compositional Pointer and Escape Analysis for Java Programs, ACM SIGPLAN Notices, 34(10):187-206, 1999.

R. Wilson, M. Lam, Efficient Context-Sensitive Pointer Analysis for C Programs, Proceedings of Programming Language Design and Implementation (PLDI), pp. 1-12, 1995.

T.H. Cormen,C.E. Leiserson,R.L. Rivest, C. Stein,Introduction to Algorithms,2001, Second Edition, MIT Press, Cambridge. Massachusetts.

David J.Pearce,Paul H. J. Kelly,Chris Hankin,Efficient Field-Sensitive Pointer Analysis for C, PASTE '04, Jun. 7-8, 2004, Washington, DC. Copyright 2004 ACM 1-58113-910-1/04/0006.

* cited by examiner ns having a correlation to pointer analysis accuracy and speed.

PROCEDURE SUMMARIES FOR POINTER ANALYSIS

FIELD OF THE INVENTION

The present invention relates to pointer analysis in computer applications.

BACKGROUND OF THE INVENTION

Pointer analysis is used for different applications, e.g., compilers, debugging tools and program understanding tools, each having different requirements. Typically, pointer analysis attempts to statically determine the runtime targets of pointer variables in a program, for example at compile time. The information obtained through pointer analysis can be used, for example, to determine whether two pointers are potentially aliased, i.e., whether the two pointers point to the same location. In traditional approaches, increasing the precision of pointer analysis increases the cost associated with the pointer analysis. The precision and the associated cost are typically controlled by adjusting the flow sensitivity and path sensitivity of the pointer analysis. The least accurate and least costly pointer analysis takes a flow insensitive approach. Accuracy and cost is increased by taking a flow sensitive approach in the pointer analysis. The most accurate and most costly approach is to take a path sensitive approach to pointer analysis. Obtaining the most precise, i.e. flow and path sensitive solution, however, is impractical and even relatively imprecise solutions can be very expensive.

SUMMARY OF THE INVENTION

The present invention is directed to a method for conducting pointer analysis on a computer program. This method includes defining a three-dimensional space containing an order sensitivity dimension, a predicate sensitivity dimension and a value persistence dimension. A point in the three-dimensional space is identified. This identified point yields values for order sensitivity, predicate sensitivity and value persistence. Pointer analysis is conducted on a computer program in accordance with the identified values for order sensitivity, predicate sensitivity and value persistence.

In one embodiment, the order sensitivity dimension is a quantification of an extent to which execution order of statements comprising the computer program on which pointer analysis is being conducted is considered in conducting pointer analysis. The order sensitivity dimension varies from order insensitive where the statements are treated as an unordered grouping to order sensitive where the statements are treated in accordance with the order dictated by the execution of the computer program. In one embodiment, the predicate sensitivity dimension is a quantification of an extent to which conditions in the computer program are considered in conducting pointer analysis. In one embodiment, the value persistence dimension is a quantification of an extent to which subsequent value assignments to pointers within the computer program supersede previous value assignments to the pointers.

In one embodiment, values for each one of the dimensions correspond to a balance between accuracy of the pointer analysis and speed of the pointer analysis, and each point in the three-dimensional space corresponds to a composite value representing the balance between accuracy and speed for all three dimensions. Therefore, the step of identifying the point in the three-dimensional space includes identifying the point corresponding to the desired composite value for accuracy and speed in all three dimensions.

In one embodiment, identification of the point in three-dimensional space includes using an analyzer capable of analyzing the computer program to select the point in three-dimensional space. In addition, using the analyzer includes identifying a desired balance between accuracy of the pointer analysis and speed of the pointer analysis and using the analyzer to select the point in the three-dimensional space in accordance with the desired balance between accuracy and speed. In one embodiment, values for each one of the dimensions correspond to a balance between accuracy of the pointer analysis and speed of the pointer analysis, and each point in the three-dimensional space corresponds to a composite value representing the balance between accuracy and speed for all three dimensions.

In one embodiment, using the analyzer to select the point further includes using the analyzer to determine a point in the three-dimensional space that is best suited for pointer analysis on a particular section of code. Alternatively, using the analyzer to select the point includes using the analyzer to determine a plurality of points in the three-dimensional space, each point best suited for pointer analysis on a particular section of code. In one embodiment, a plurality of superior points is identified in the three-dimensional space to be used for pointer analysis, and identifying a point in the three-dimensional space includes selecting a point from the plurality of superior points.

DETAILED DESCRIPTION

Figure 1:
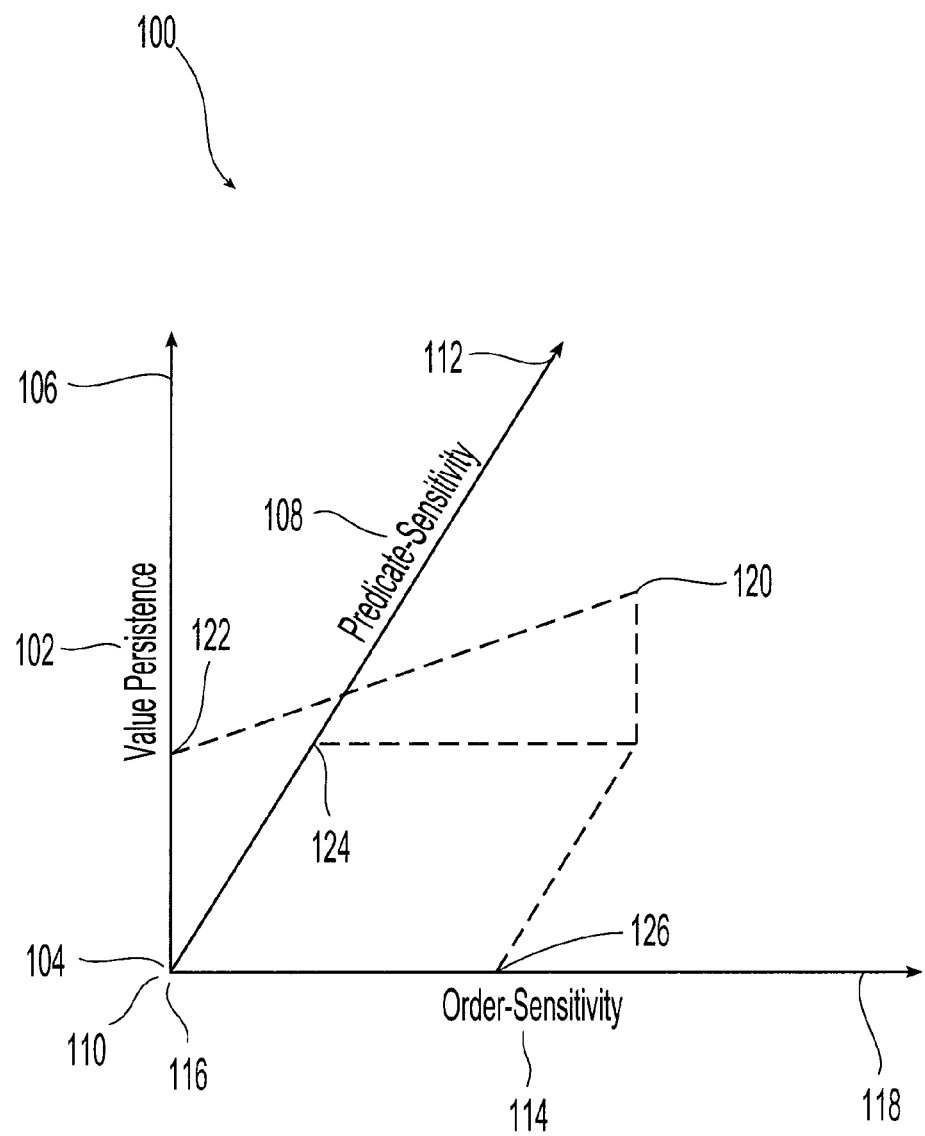
FIG. 1 is a graph of an embodiment of a three-dimensional space to be used for the identification of pointer analyses parameters in accordance with the present invention.

The present invention is directed to methods for conducting pointer analysis on computer programs. In general, pointer analysis is used to determine statically, e.g., at the time a given computer program is compiled, the potential values of pointers within the computer program. Therefore, potential problems involving pointers can be discovered, reported and even corrected. Methods for conducting pointer analysis in accordance with the present invention can be used on a variety of computer programs that are analyzed using any suitable analyzer that is known and available in the art. Suitable analyzers include, but are not limited to, static analysis tools, compilers, program understanding tools, security analysis and understanding tools, test-case generators, bug finding tools, verifiers, cross-reference tools, model checkers and symbolic execution tools. In one embodiment, the analyzer is a bug finding tool. The accuracy and speed of the pointer analysis can be selected dynamically, for example, when the computer program is being analyzed.

In one exemplary embodiment, a multi-dimensional space is defined containing dimensions that are related to or that affect pointer analysis. Suitable multi-dimensional spaces include a two-dimensional space, a three-dimension space and spaces having even greater dimensionality. Referring to FIG. 1, the multi-dimensional space is a three-dimensional space 100, the three-dimensional space includes an order sensitivity dimension 114, a predicate sensitivity dimension 108 and a value persistence dimension 102. In one embodiment, each one of the dimensions represents a sensitivity value for the associated constraint to be used in pointer analysis. Other dimensions can be included, for example dimension associated with context sensitivity; however, other dimensions can be modeled using combinations of the three dimensions illustrated in FIG. 1. Traditional pointer analyses that are referred to as flow-insensitive, flow-sensitive and path-sensitive each corresponds to points in the three-dimensional space. There are many other points in the three-dimensional space that correspond to other types of pointer analyses. For example, context sensitivity is a point that includes value sensitivity and predicate sensitivity.

The computer program on which pointer analysis is conducted is constructed of a plurality of statements that are executed subject to a prescribed order. This order, i.e., the flow of the computer program, affects the value of pointers within the computer program. The order sensitivity dimension expresses the extent to which the execution order of the computer program statements are considered during pointer analysis. In one embodiment, the order sensitivity dimension is a quantification of the extent to which the execution order of statements of the computer program on which pointer analysis is being conducted is considered during pointer analysis.

The order sensitivity dimension varies from complete order insensitivity 116 to full order sensitivity 118. Order-sensitive analyses take the order of the computer program statements into account. In one embodiment, these analyses use a form of iterative dataflow framework to produce a potentially different analysis result for each procedure. Order-insensitive analyses consider the code as a pile of unordered statements and, therefore, are incapable of extracting any property that depends on the execution order. Therefore, in one embodiment, the order sensitivity dimension varies from order insensitive where the statements are treated as an unordered grouping to order sensitive where the statements are treated in accordance with the order dictated by the execution of the computer program.

The predicate sensitivity dimension expresses a quantification of the extent to which conditions in the computer program are considered during pointer analysis. These are conditions under which each statement in the given program can be executed. For example, if a given predicate does not exist, then certain statements within the computer program cannot be executed until the prescribed predicate does exist. These predicates can be considered as conditions precedent to the execution of portions of a computer program, and in general, predicate-sensitivity expresses the ability to correlate these conditions precedent in the code of the computer program. The predicate sensitivity dimension varies from a completely predicate insensitive value 110 in which no conditions precedent are taken into account to a completely predicate sensitive value 112 in which all conditions precedent are taken into account.

The value persistence dimension 102 expresses a quantification of an extent to which subsequent value assignments within the computer program supersede previous value assignments. These are values under which each statement in the given program can be superseded by other similar values. For example, if a given value assignment is superseded by a subsequent value assignment then previous value assignments do not have to be tracked. These value assignments can be considered as statements that kill other similar value assignments. In general, value-sensitivity expresses the ability to kill these value assignments in the code of the computer program. The value sensitivity dimension varies from a completely value insensitive value 104 in which no value kills are taken into account to a completely value sensitive value 106 in which all values are taken into account.

The value of each one of the three dimensions contributes to determining the parameters under which the pointer analysis is conducted. In particular, these three values are taken in combination to generate the parameters under which the pointer analysis is conducted. The three-dimensional space that includes an axis for each one of the three dimensions provides a plurality of combinations of the various values of three dimensions. Each point within the three-dimensional space corresponds to one of these combinations. Therefore, a given point 120 within the three-dimensional space is identified. This identified point yields values for order sensitivity 126, predicate sensitivity 124 and value persistence 122. Having identified these values, pointer analysis on the computer program is conducted in accordance with the identified values for order sensitivity, predicate sensitivity and value persistence.

The point in three dimension space is selected based on the desired accuracy and speed of the pointer analysis. In general, a trade-off exists between accuracy and speed in pointer analysis. Each dimension has a given trade-off relationship between accuracy and speed. These individual trade-offs can be combined into an overall trade-off for the three combined dimensions, or for all the dimensions in any multi-dimensional space. Therefore, any given point in the multi-dimensional space has a combined or overall associated accuracy versus speed balance. Sometimes, as in traditional pointer analysis, greater accuracy is achieved at the expense of speed and vice versa. Alternatively, in contrast to traditional pointer analysis, increases in accuracy can correspond to less costly analysis. In one embodiment, the values for each one of the dimensions correspond to a balance between accuracy of the pointer analysis and speed of the pointer analysis. Therefore, each given value of one of the dimensions corresponds to a given accuracy in the pointer analysis and a given speed with which the pointer analysis can be conducted. For example, predicate insensitive pointer analysis allows greater speed but produces less accurate results, while predicate sensitive pointer analysis takes longer and produces more accurate results. Although the balance between accuracy and speed can be considered for each dimension separately, the trade-offs of speed versus accuracy of all three dimensions are combined. Therefore, each point in the three-dimensional space, including the identified point for conducting the pointer analysis, corresponds to a composite value representing the balance between accuracy and speed for all three dimensions. The desired level of accuracy and speed can be determined, for example, in accordance with pre-defined parameters or based on user input. Therefore, identification of the point in the three-dimensional space involves identifying the point corresponding to the desired composite value for accuracy and speed in all three dimensions.

In one embodiment, pointer analysis is conducted when the computer program is statically analyzed, for example at the time the computer program is compiled or when a debugging tool is run on the program before the program is actually executed. In one embodiment, identification of the point in three-dimensional space is conducted in three steps. First, a preliminary analysis determines superior points in the three-dimensional space. Subsequent implementations ignore any inferior, i.e., non-superior, points in the three-dimensional space when selecting a point to be used in defining the parameters for pointer analysis. Second, a user can specify before analysis starts a desired trade-off between accuracy and cost. This trade-off is then used by the analyzer to choose a set of points in the three-dimensional space. Third, during the analysis, the analyzer may determine dynamically which of the points allowed by user input is best suited for a particular section of the code being analyzed. In using the analyzer to identify the point in the identified three-dimensional space, a desired balance between accuracy of the pointer analysis and speed of the pointer analysis is identified. This identification can be accomplished automatically by the analyzer or in accordance with user supplied input. In addition, the analyzer can identify a plurality of points within the three-dimensional space, each point selected for the analysis of a given section of code.

Having identified the desired balance between speed and accuracy, the analyzer selects the point in the three-dimensional space in accordance with this desired balance between accuracy and speed. In one embodiment, values for each one of the dimensions correspond to a balance between accuracy of the pointer analysis and speed of the pointer analysis, and each point in the three-dimensional space corresponds to a composite value representing the balance between accuracy and speed for all three dimensions at that point. Therefore, these values are used by the analyzer in selecting the point in the three-dimensional space in accordance with the desired balance between speed and accuracy. In one embodiment, two or more points within the multi-dimensional space may have an overall value for speed and accuracy that corresponds to the desired value or user-defined value. Therefore, all of these points are identified, and one of the points is selected for pointer analysis. This selection can be made randomly or in accordance with other factors including the values of the underlying dimensions at each point.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method conducting pointer analysis on a computer program in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for conducting pointer analysis on a computer program, the method comprising:
 defining a three-dimensional space comprising an order sensitivity dimension, a predicate sensitivity dimension and a value persistence dimension, wherein the order sensitivity dimension comprises a quantification of an extent to which execution order of statements of the computer program are considered in pointer analysis, the predicate sensitivity dimension comprises a quantification of an extent to which conditions in the computer program are considered in pointer analysis and the value persistence dimension comprises a quantification of an extent to which subsequent value assignments to pointers within the computer program supersede previous value assignments to the pointers during pointer analysis;
 identifying a point in the three-dimensional space, the point yielding values for the order sensitivity, predicate sensitivity and value persistence; and
 conducting pointer analysis on the computer program using the identified values for the order sensitivity, predicate sensitivity and value persistence.

2. The method of claim 1, wherein the order sensitivity dimension varies from order insensitive where the statements are treated as an unordered grouping to order sensitive where the statements are treated in accordance with the order dictated by the execution of the computer program.

3. The method of claim 1, wherein:
values for each one of the dimensions corresponds to a balance between accuracy of the pointer analysis and speed of the pointer analysis and each point in the three-dimensional space corresponds to a composite value representing the balance between accuracy and speed for all three dimensions; and
the step of identifying the point in the three-dimensional space further comprises identifying the point corresponding to the desired composite value for accuracy and speed in all three dimensions.

4. The method of claim 1, wherein the step of identifying the point in three-dimensional space further comprises using an analyzer capable of analyzing the computer program to select the point in three-dimensional space.

5. The method of claim 4, wherein the step of using the analyzer further comprises identifying a desired balance between accuracy of the pointer analysis and speed of the pointer analysis and using the analyzer to select the point in the three-dimensional space in accordance with the desired balance between accuracy and speed.

6. The method of claim 5, wherein values for each one of the dimensions correspond to a balance between accuracy of the pointer analysis and speed of the pointer analysis and each point in the three-dimensional space corresponds to a composite value representing the balance between accuracy and speed for all three dimensions.

7. The method of claim 4, wherein the step of using the analyzer to select the point further comprises using the analyzer to determine a point in the three-dimensional space that is best suited for pointer analysis on a particular section of code.

8. The method of claim 4, wherein the step of using the analyzer to select the point further comprises using the analyzer to determine a plurality of points in the three-dimensional space, each point best suited for pointer analysis on a particular section of code.

9. The method of claim 1, wherein the method further comprises identify a plurality of superior points in the three-dimensional space to be used for pointer analysis and the step of identifying a point in the three-dimensional space further comprises selecting a point from the plurality of superior points.

10. A non-transitory computer-readable medium containing a computer-executable code that when read by a computer causes the computer to perform a method for conducting pointer analysis on a computer program, the method comprising:
defining a three-dimensional space comprising an order sensitivity dimension, a predicate sensitivity dimension and a value persistence dimension, wherein the order sensitivity dimension comprises a quantification of an extent to which execution order of statements of the computer program are considered in pointer analysis, the predicate sensitivity dimension comprises a quantification of an extent to which conditions in the computer program are considered in pointer analysis and the value persistence dimension comprises a quantification of an extent to which subsequent value assignments to pointers within the computer program supersede previous value assignments to the pointers during pointer analysis;
identifying a point in the three-dimensional space, the point yielding values for the order sensitivity, predicate sensitivity and value persistence; and
conducting pointer analysis on the computer program using the identified values for the order sensitivity, predicate sensitivity and value persistence.

11. The non-transitory computer-readable medium of claim 10, wherein the order sensitivity dimension varies from order insensitive where the statements are treated as an unordered grouping to order sensitive where the statements are treated in accordance with the order dictated by the execution of the computer program.

12. The non-transitory computer-readable medium of claim 10, wherein:
values for each one of the dimensions corresponds to a balance between accuracy of the pointer analysis and speed of the pointer analysis and each point in the three-dimensional space corresponds to a composite value representing the balance between accuracy and speed for all three dimensions; and
the step of identifying the point in the three-dimensional space further comprises identifying the point corresponding to the desired composite value for accuracy and speed in all three dimensions.

13. The non-transitory computer-readable medium of claim 10, wherein the step of identifying the point in three-dimensional space further comprises using an analyzer capable of analyzing the computer program to select the point in three-dimensional space.

14. The non-transitory computer-readable medium of claim 13, wherein the step of using the analyzer further comprises identifying a desired balance between accuracy of the pointer analysis and speed of the pointer analysis and using the analyzer to select the point in the three-dimensional space in accordance with the desired balance between accuracy and speed.

* * * * *